Nov. 19, 1968   A. LETO   3,411,366
ADJUSTABLE STOP MECHANISM
Filed Aug. 22, 1966
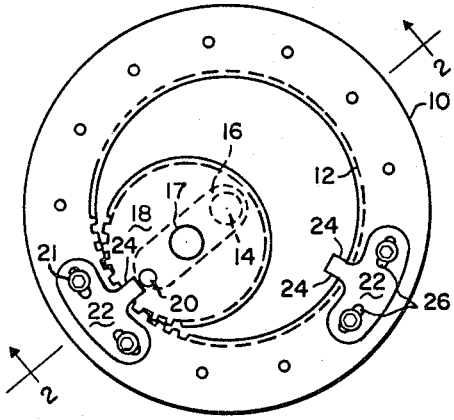
FIG. 1
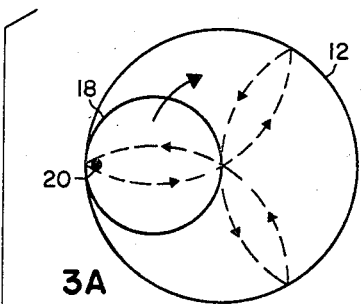
3A
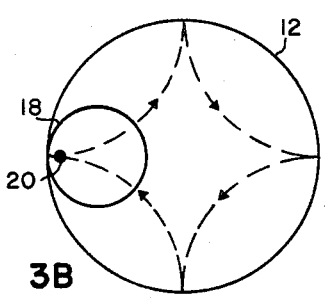
3B
FIG. 3
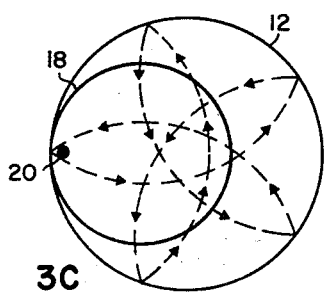
3C
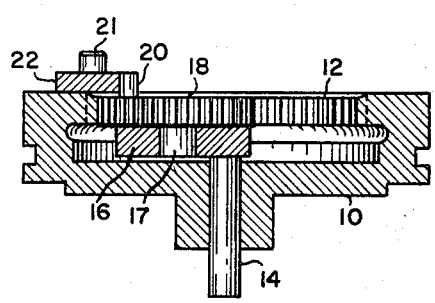
FIG. 2
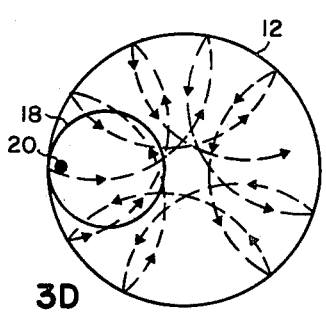
3D
*INVENTOR.*
ALFONSO LETO
BY Joseph Dwyer
*ATTORNEY*

United States Patent Office 3,411,366
Patented Nov. 19, 1968

3,411,366
ADJUSTABLE STOP MECHANISM
Alfonso Leto, Granada Hills, Calif., assignor to General Precision Systems Inc., a corporation of Delaware
Filed Aug. 22, 1966, Ser. No. 574,125
1 Claim. (Cl. 74—10.2)

ABSTRACT OF THE DISCLOSURE

A shaft rotation of stop mechanism, the limits of which may be readily adjustable while the mechanism is coupled to its associated mechanism. The input shaft drives a planetary gear system in which a small spur gear rotates in a stationary internal gear. An index pin in the surface near the periphery of the spur gear describes a hypocycloid as the input shaft rotates and strikes a plate which is adjustably mounted at any desired position around the internal gear.

---

This invention relates to stop mechanisms, and more particularly to a novel and improved rotatable shaft stop mechanism capable of being adjusted while mounted in its operating position.

Stop mechanisms are particularly useful in analog computing devices, such as potentiometers, servos, or the like. The stop mechanism, when attached to its associated computing module, provides physical limitations to the module to prevent an overrun beyond a desired limit. Rotary stop mechanisms are generally supplied with a rotatable shaft which may be connected to the shaft of a component which is to be so limited. Or the shaft of a stop mechanism may be integral with the shaft of a potentiometer for the purposes of limiting the number of turns of rotation of the potentiometer shaft and, therefore, the limits of the resistance produced in the potentiometer.

Most rotary shaft stop mechanisms are not adjustable to provide a limitation of the number of turns, and/or fractions of a turn. Furthermore, those stop mechanisms that are adjustable must be adjusted by a technician prior to mounting the stop mechanism to its associated module.

It is an object of this invention to provide a rotatable shaft stop mechanism in which the adjustments are easily accessible so that the mechanism may be adjusted while it is mounted to its associated module.

Briefly described, the stop mechanism comprises a circular cup-shaped housing having an internal gear in the inner periphery. A rotatable input shaft is coaxially mounted through the closed end of the housing and drives a rotatable arm within the housing. A spur gear rotatably mounted upon, and parallel to, the rotatable arm, is positioned to engage an internal gear in the housing and an index pin extending from the surface near the periphery of the spur gear is positioned to strike one or more index plates adjustably mounted on the top surface of the housing.

As the input shaft is rotated, the spur gear with its index pin is rotated in the internal gear in the housing, so that the path of the pin defines a cyclic pattern which is determined by the ratio of the number of teeth in the internal gear to the number of teeth on the spur gear. The index plates, appropriately positioned upon the housing to intercept the paths of the pin, will be struck by the pin to stop further rotation of the input shaft.

Because of the construction of the mechanism, the index plates are easily adjusted while the device is in position and connected to its associated module. Furthermore, the mechanism may be miniaturized and can be made to fit a standard synchro module of an analog computing device or designed integrally with a rotating component, such as a potentiometer.

In the figures which illustrate a preferred embodiment of the invention:

FIGURE 1 is a plane view illustrating the arrangements of the component in the mechanism;

FIGURE 2 is an elevation view taken along the line 2—2 of FIGURE 1, and

FIGURE 3 are illustrations of cyclic patterns taken by the index pin for various rations of the number of teeth in the internal gear to the number of teeth on the spur gear.

In the embodiment illustrated in FIGURES 1 and 2, a circular cup-shaped housing 10 is designed so that its outside diameter and configuration will permit the housing to fit a standard synchro module. The internal periphery of housing 10 is provided with an internal gear 12 which extends around the internal periphery and which has any desired number of teeth as will be more fully discussed hereinafter. Extending through the closed end of housing 10 and coaxial with the housing is an input shaft 14 which may be supported by suitable shaft bearings (not shown).

Connected to shaft 14 and interior of the housing 10 is an arm 16 which is rotated by input shaft 14. A shaft 17 is mounted in the surface of arm 16 and is parallel to, but not coaxial with, shaft 14. The exact position of shaft 17 in arm 16 will depend upon the diameter of a gear 18 which is rotatably mounted to shaft 17 and adapted to engage the teeth of the internal gear 12 in housing 10. Thus, the teeth of spur gear 18 must be of the same pitch as those of internal gear 12.

Extending normal to the surface of spur gear 18 and mounted near the periphery of that gear is an index pin 20, and mounted to housing 10 and supported thereto by suitable screws 21 is an index plate 22. Index plate 22 is positioned on the surface of housing 10 so that its strike plate 24 will be struck by index pin 20, as spur gear 18 rotates, to stop further rotation of the spur gear. For the purpose of providing adjustment capabilities, index plate 22 should be provided with elongated screw slots 26.

In operation, shaft 14 is rotated by a rotating component coupled to shaft 14. As shaft 14 rotates, arm 16 will rotate to draw spur gear around the internal periphery of housing 10. Since the teeth on spur gear 18 engage the internal gear 12 of housing 10, spur gear 18 will have an individual rotation opposite to that of its overall rotation on arm 16, and pin 20 will define a cyclic path, as shown in FIGURE 3.

The ratio of number of teeth in internal gear 12 to the number of teeth on spur gear 18 is important for satisfactory operation of the invention. If this ratio is a whole number, there can only be one revolution of shaft 14 before index pin 20 strikes and is stopped by index plate 22. Thus, it is most desirable that the tooth ratio be a fractional number. This concept is illustrated in FIGURE 3, wherein FIGURE 3A illustrates the condition that exists when the ratio of internal teeth to spur gear teeth is equal to two. Here, spur gear 18 has a pitch diameter equal to one half the pitch diameter of gear 12. As shaft 14 and arm 16 are rotated in a clockwise direction, as indicated by the arrow, spur gear 18 will individually rotate in a counterclockwise direction and index pin 20 will assume the path illustrated by the dashed line and arrows of FIGURE 3A. It can be seen that upon one rotation of shaft 14, index pin 20 will return to its starting position and will be stopped by the strike plate 24 on index plate 22.

FIGURE 3B illustrates a condition that exists when the ratio of teeth in internal gear 12 to the teeth of spur gear 18 is equal to three. As shaft 14 rotates in a clockwise direction, spur gear 18 will individually rotate in a counterclockwise direction and index pin 20 will take the path, as shown in the dashed line and arrows in FIGURE 3B and will return to its point of origin and will be stopped by index plate 42 upon completing one revolution of input shaft 14.

FIGURE 3C illustrates the path of pin 20 when the ratio of teeth in internal gear 12 to the number of teeth in spur gear 18 is equal to one and a half. By following the path of index pin 20, as shown by the dashed line and arrows, it can be seen that pin 20 will return to its point of origin after two complete revolutions of input shaft 14. Thus, it can be seen that if the ratio of the number of teeth in gear 12 to the number of teeth in gear 18 is a whole number, only one revolution of shaft 14 may be obtained. If, as shown in FIGURE 3C, the ratio contains a fraction, the number of turns of shaft 14 will depend upon the denominator of the fraction. In FIGURE 3D the ratio is in the order of two and two-thirds and it can be seen that a great number of turns of shaft 14 may be completed before pin 20 again contacts strike plate 24.

As shown in FIGURE 1, the invention contemplates the use of a second index plate 22 appropriately located at a desired point on the periphery of housing 12. Second index plate 22 is identical to first index plate 22 and is adjustably positioned by suitable threaded holes in the periphery of housing 10 so that the index plate may be located at any desirable position around the periphery. Thus, second index plate 22 may be positioned to intercept the path of index pin 20 after any desirable number of rotations of input shaft 14, and/or a fraction thereof, if the ratio of the gear is not a whole number.

In actual practice, it has been found desirable to have a ratio of the number of teeth in internal gear 12 to the number of teeth in spur gear 18 equal to approximately one and one third. It is apparent that many different gear ratios may be utilized and different congurations may be employed without departing from the spirit of the invention.

I claim:
1. An adjustable stop mechanism for limiting the rotation of an input shaft, said mechanism comprising:
 a housing having in one surface a tubular recess supporting an annular internal gear, said housing having a hole receiving a totatable input shaft, said hole being coaxial with said tubular recess and extending through said housing;
 an arm mounted on said input shaft and positioned along a radius of said tubular recess in said housing;
 a spur gear rotatably mounted on said arm and engaging said internal gear;
 an index pin mounted in the surface and near the periphery of said spur gear, said pin extending above the surface of said housing; and
 at least one index plate adjustably mounted to said surface of said housing, said plate extending into said tubular recess for engaging said index pin to stop rotation of said input shaft after any selected rotation of said spur gear.

References Cited
UNITED STATES PATENTS

| | | | |
|---|---|---|---|
| 912,717 | 2/1909 | Murphy | 74—526 |
| 1,330,298 | 2/1920 | Baird | 74—526 X |
| 2,250,584 | 7/1941 | Krueger et al. | 74—52 |
| 2,351,394 | 6/1944 | Bristol | 74—52 |
| 2,991,662 | 7/1961 | Werner | 74—10.2 X |

MILTON KAUFMAN, *Primary Examiner.*